April 20, 1926.  
C. C. DILLON  
1,581,841  
COMBINED WEEDER AND CULTIVATOR  
Filed June 7, 1924    2 Sheets-Sheet 1
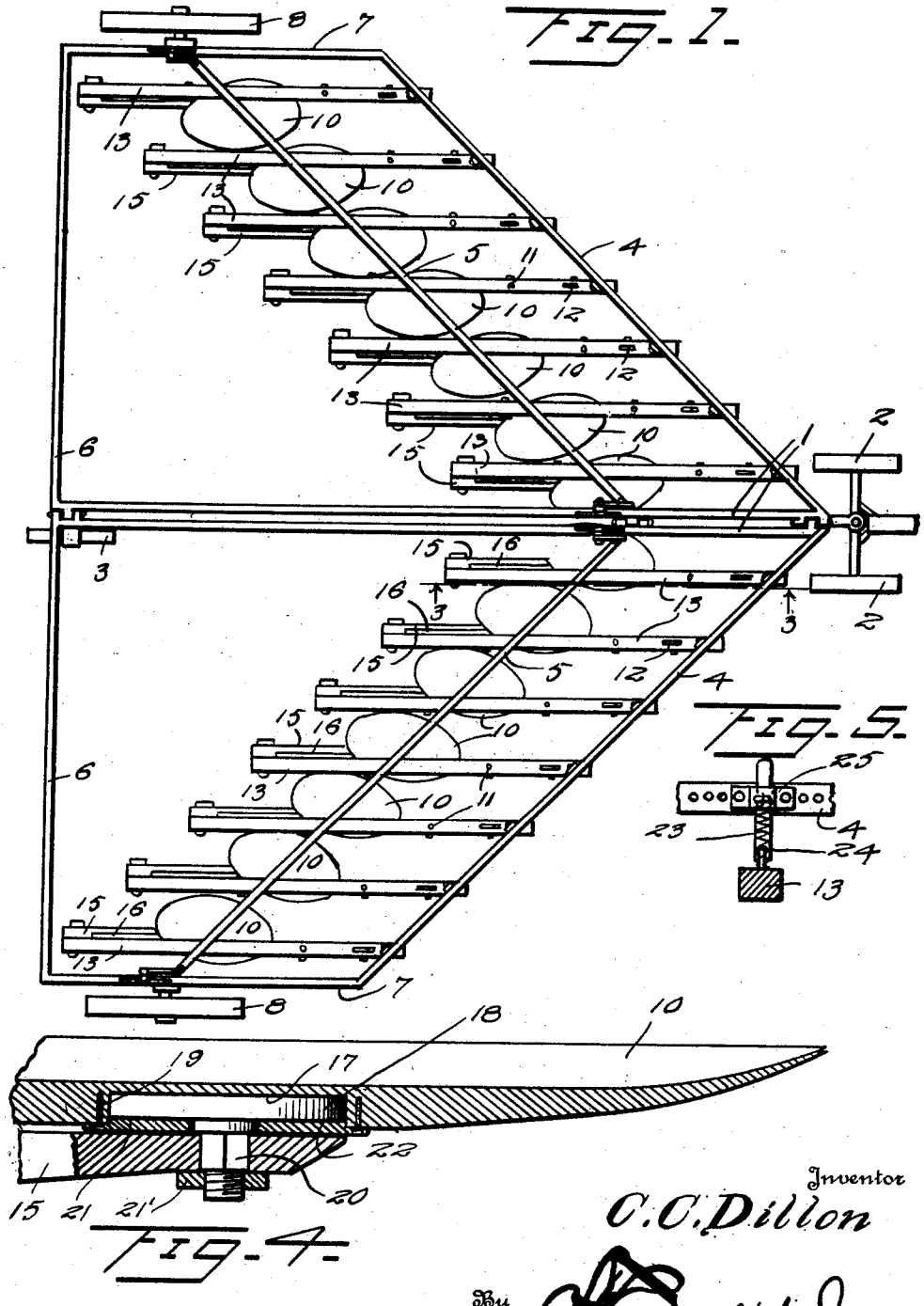

April 20, 1926.  
C. C. DILLON  
COMBINED WEEDER AND CULTIVATOR  
Filed June 7, 1924  
1,581,841  
2 Sheets-Sheet 2
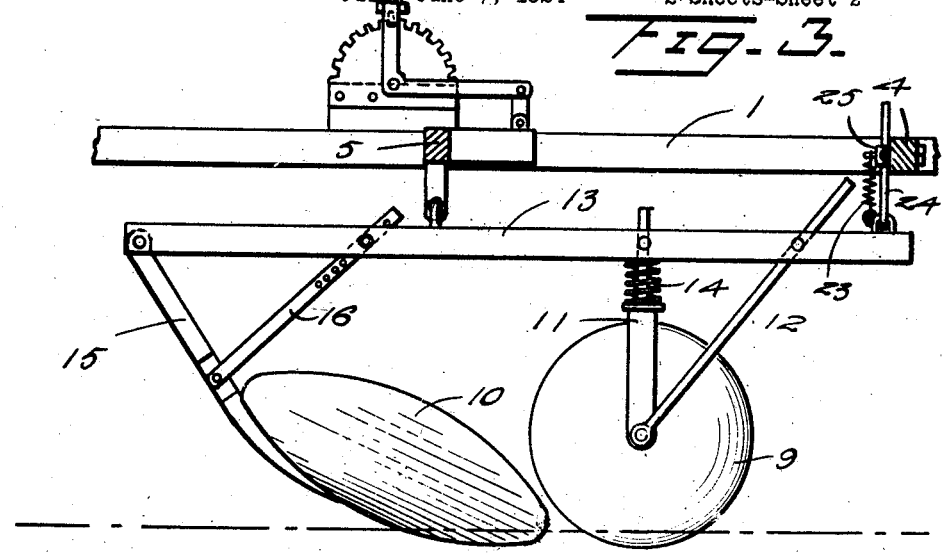
Fig. 3.
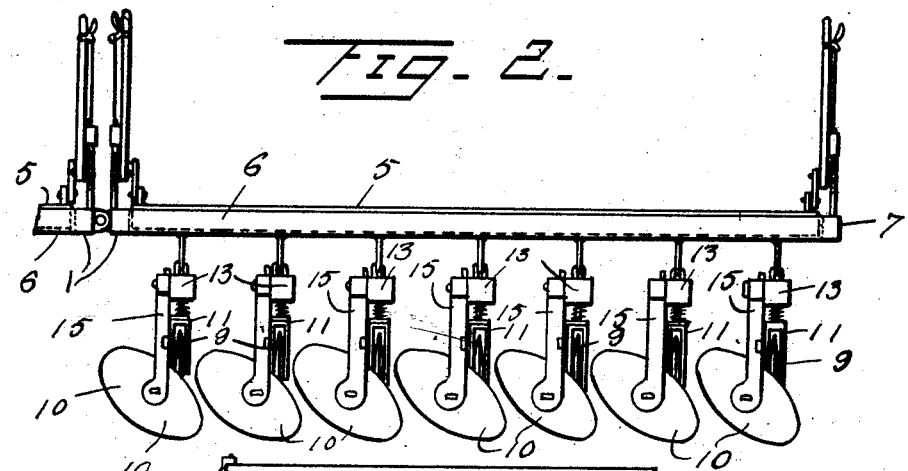
Fig. 2.
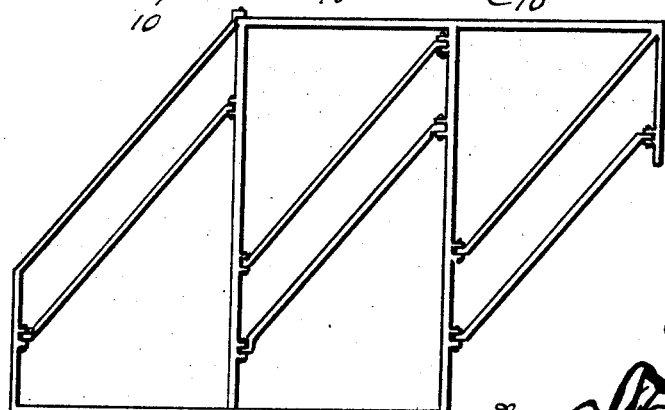
Fig. 6.
Inventor  
C. C. Dillon  
By  
Attorney Patented Apr. 20, 1926.

1,581,841

UNITED STATES PATENT OFFICE.

CHARLES C. DILLON, OF VALIER, MONTANA.

COMBINED WEEDER AND CULTIVATOR.

Application filed June 7, 1924. Serial No. 718,541.

*To all whom it may concern:*

Be it known that I, CHARLES C. DILLON, a citizen of the United States, residing at Valier, in the county of Pondera and State of Montana, have invented certain new and useful Improvements in Combined Weeders and Cultivators; and I do hereby declare the following to be a full, clear, and exact description of the invention, such as will enable others skilled in the art to which it appertains to make and use the same.

The present invention provides an implement for use in the fields for eradicating and destroying weeds and other objectionable growth and turning the same under the soil to rot and enrich the same.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a cultvator and weeder embodying the invention,

Figure 2 is a rear view thereof,

Figure 3 is a longitudinal section on the line 3—3 of Figure 1,

Figure 4 is an enlarged sectional view of the furrow-turning disk and the supporting standard, Figure 5 is a detail view showing more clearly the connection of the frame with the beam, and Figure 6 is a detail view of a modified form of frame.

Corresponding and like parts are referred to in the following description and designated in the several views of the drawings by like reference characters.

The frame of the implement comprises a centrally disposed beam 1 provided at its front end with a pair of supporting wheels 2 and at its rear with a caster wheel 3. Laterally disposed bars 4, 5 and 6 are hingedly connected at their inner ends with the longitudinal beam 1 and are connected at their outer ends by a longitudinally disposed bar 7 which is provided with a ground wheel 8. The several bars 4, 5, 6 and 7 constitute a frame and there is provided a frame at each side of the longitudinal beam 1 and by having the frames hinged to the beam 1 they more readily conform to the surface of the ground. Each of the frames is provided with a plurality of rotary colters 9 and disk furrow openers 10, the latter being disposed in the rear of the former and operating to form a trench or furrow as the implement is drawn over the field. Each of the rotary colters 9 is mounted upon the lower end of a standard 11 in any preferred way and said standard is strengthened by means of a brace 12, both the standard and brace having adjustable connection with a beam 13 which is connected to the main frame. A helical spring 14 mounted upon the standard 11 normally exerts a pressure to hold the colter 9 to its work and admit of its yielding when meeting with an obstruction.

A standard 15 is attached to the beam 13 in any preferred way and a brace 16 connects said standard with the beam and these parts may be adjustable whereby to provide for a setting of the furrow-opening disks 10. The disk 10 is dished and is thick at the center and decreases in thickness towards its outer cutting edge. A recess 17 is formed in the bottom side of the disk 10 and receives the head 18 of a fastening pivotally connecting the disk to the standard. The pivot fastening has an enlargement 19 adjacent the head 18 and its shank 20 is reduced and secured within an opening formed in the lower end of the standard 16, a clamp nut 21 serving to confine the standard 15 between the enlargement 19 and the nut 21. The shank 20 is preferably of non-circular form to prevent rotation thereof in the standard. A plate 22 closes the lower side of the recess 17 and confines the head 18 and this plate is approximately of the same thickness as the enlargement 19 and its outer edge underlaps the portion of the disk 10 adjacent the recess 17 and is bolted or otherwise made fast thereto. While the head 18 obtains a snug fit within the recess 17, nevertheless the disk 10 is adapted to rotate freely without any binding action. The disk 10 is disposed in an approximate horizontal position so that its edge operates in advacne of the portion in the rear, thereby presenting a cutting surface almost parallel with the beam 13, whereby provision is had to allow the earth and weeds to pass backward and to the side of the furrow opening and turning disks. This disk may be of any diameter and inclines laterally and upwardly and rearwardly so as to operate substantially the same manner as the moldboard of a turning plow. The rotary colter sustains side draft besides cutting through turf, roots and the like in advance of the furrow-opening and turning disk 10.

In Figure 6 is shown a modified frame which, unlike the frame shown in the other views, will throw the dirt and weeds in one direction and leave the ground with a smooth surface. The preferred form of frame ridges the earth and overcomes side draft and for these reasons is preferred.

Each of the beams 13 is movable vertically and is held to its work by a spring 23. A standard 24 connected to the beams passes through a keeper 25 which is adjustably connected to the bar 4, Figure 5. In this manner the beams 13 are adapted to yield independently so as to pass over obstructions without causing any injury to the parts.

What is claimed is:

A cultivator and weeder comprising a longitudinally disposed beam, bars projecting laterally from the beam and pivoted at their inner ends thereto, longitudinal bars connecting the outer ends of the lateral bars, supporting wheels at the ends of the longitudinal beam and at the outer ends of the lateral bars, a plurality of beams coupled to the lateral bars, a rotary colter and a furrow-opening and weed-turning disk attached to each of the several beams, the disks being disposed in the rear of the colters and having an approximate horizontal arrangement and inclining laterally and upwardly and rearwardly.

In testimony whereof I affix my signature.

CHARLES C. DILLON.